United States Patent
Johnson

(10) Patent No.: US 11,867,530 B2
(45) Date of Patent: *Jan. 9, 2024

(54) TRACKING A MOVING SPORTS OBJECT IN VARIED ENVIRONMENTAL CONDITIONS

(71) Applicant: EDH US LLC, Orlando, FL (US)

(72) Inventor: Henri Johnson, Windermere, FL (US)

(73) Assignee: EDH US LLC, Orlando, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/147,354

(22) Filed: Dec. 28, 2022

(65) Prior Publication Data

US 2023/0160693 A1 May 25, 2023

Related U.S. Application Data

(63) Continuation of application No. 16/742,041, filed on Jan. 14, 2020, now Pat. No. 11,573,082.

(Continued)

(51) Int. Cl.
*G01C 5/06* (2006.01)
*A63B 24/00* (2006.01)
(Continued)

(52) U.S. Cl.
CPC ............ *G01C 5/06* (2013.01); *A63B 24/0021* (2013.01); *G01W 1/06* (2013.01);
(Continued)

(58) Field of Classification Search
CPC ... G01C 5/06; A63B 24/0021; A63B 2102/32; A63B 2102/18; A63B 2102/02;
(Continued)

(56) References Cited

U.S. PATENT DOCUMENTS

| 5,509,295 A | * | 4/1996 | Bartoli ............... G01N 1/04 73/30.02 |
| 2005/0178622 A1 | * | 8/2005 | Blue ................. B60T 17/02 188/71.1 |

(Continued)

OTHER PUBLICATIONS

"U.S. Appl. No. 16/742,041, Corrected Notice of Allowability dated Sep. 29, 2022", 3 pgs.

(Continued)

*Primary Examiner* — Steve Rowland
(74) *Attorney, Agent, or Firm* — Schwegman Lundberg & Woessner, P.A.

(57) ABSTRACT

Systems, methods and computer-readable media are provided for determining an effective altitude in relation to a moving sports object. In some examples, a method includes determining respective values for an air temperature, an air pressure, and a relative humidity of an environment of interest. Based on the determined respective values of the air temperature, the air pressure, and the relative humidity, an air density for the environment of interest is calculated to derive a first air density value. A second air density value is derived for a reference environment. An absolute value of a difference between the first and second air densities is compared against a preset comparison value and, based on the comparison being equal to or smaller than the preset comparison value, an output including an indicator of the effective altitude is generated.

17 Claims, 6 Drawing Sheets

Related U.S. Application Data

(60) Provisional application No. 62/792,034, filed on Jan. 14, 2019.

(51) Int. Cl.
*G01W 1/06* (2006.01)
*A63B 102/02* (2015.01)
*A63B 102/18* (2015.01)
*A63B 102/32* (2015.01)

(52) U.S. Cl.
CPC ............... *A63B 2024/0034* (2013.01); *A63B 2024/0056* (2013.01); *A63B 2102/02* (2015.10); *A63B 2102/18* (2015.10); *A63B 2102/32* (2015.10); *A63B 2220/72* (2013.01); *A63B 2220/73* (2013.01); *A63B 2220/74* (2013.01); *A63B 2220/75* (2013.01); *A63B 2220/76* (2013.01); *A63B 2225/20* (2013.01); *A63B 2225/50* (2013.01)

(58) Field of Classification Search
CPC .... A63B 2024/0053; A63B 2024/0034; A63B 2024/0056
See application file for complete search history.

(56) References Cited

U.S. PATENT DOCUMENTS

| | | | |
|---|---|---|---|
| 2011/0021293 A1* | 1/2011 | York | A63B 71/06 |
| | | | 473/409 |
| 2014/0135956 A1* | 5/2014 | Thurman | G09B 19/0038 |
| | | | 700/91 |
| 2014/0180451 A1* | 6/2014 | Marty | A63B 24/0084 |
| | | | 700/91 |
| 2015/0233713 A1* | 8/2015 | Wolf | G01N 19/10 |
| | | | 702/166 |
| 2018/0200582 A1* | 7/2018 | Thurman | G09B 19/0038 |
| 2018/0229080 A1* | 8/2018 | Martin | G01S 13/865 |
| 2020/0225031 A1 | 7/2020 | Johnson | |

OTHER PUBLICATIONS

"U.S. Appl. No. 16/742,041, Non Final Office Action dated Apr. 11, 2022", 6 pgs.

"U.S. Appl. No. 16/742,041, Notice of Allowance dated Sep. 22, 2022", 7 pgs.

"U.S. Appl. No. 16/742,041, Response Filed Sep. 9, 2022 to Non Final Office Action dated Apr. 11, 2022", 9 pgs.

* cited by examiner

TRACKING A MOVING SPORTS OBJECT IN VARIED ENVIRONMENTAL CONDITIONS

CROSS-REFERENCE TO RELATED APPLICATION

This application is a continuation of U.S. patent application Ser. No. 16/742,041, filed Jan. 14, 2020, which application claims priority to U.S. Provisional Patent Application Ser. No. 62/792,034, filed Jan. 14, 2019, each of which are incorporated by reference herein in their entirety.

BACKGROUND

In many sports, objects are projected through the air to a reach an intended position to gain a score or to reach a desired position underway to scoring. Success depends on the sportsperson's skill and ability, as well as the way the prevailing environmental conditions influence the projected object's flight. Unfortunately, atmospheric effects on an object's flight path can be complex and not easy to understand.

Projectile flight may be affected by air density. Air density however depends on several factors including temperature, relative humidity, and air pressure. A sportsperson is therefore challenged to understand these factors, particularly in real time, and can find it very hard to relate projectile flight to the different factors that together determine air density.

BRIEF SUMMARY

Examples of the present disclosure seek to provide a convenient, practical way in which a sportsperson (for example, a player or coach) can understand, apply and predict the effects of atmospheric conditions in his or her sport. In one example, a "simplification" is provided which allows a sportsperson to understand and build up knowledge and skills about the way atmospheric conditions affect the flight of the object against just one variable, namely an "effective altitude" discussed further below. In being presented as a dimension of length (e.g. a foot), the variable is also much easier to relate to than the more abstract concept of "air density".

As mentioned above, in many sports, objects are projected through the air to a reach an intended position to gain a score or to reach a desired position underway to scoring. Success depends on the sportsperson's skill and ability, as well as the way the prevailing environmental conditions influence the projected object's flight. Wind, representing movement of the air medium, also influences an object's flight. Both wind speed and direction, both variable over time, location, and height, may affect the flight of an object.

Another subtler factor influencing the flight of an object is the air density, a characteristic of the medium through which the object travels. Air density, as well as the translational and rotational speeds of the object, are the main determinants of forces that act on the object in flight. In the games of tennis, baseball and golf the loss of speed through drag force and horizontal curvature of a flight path through lateral forces related to rotational motion of the ball is clearly observed and often exploited by sportspersons.

The way in which the atmosphere's air density can affect an object's flight path are complex and not easy to understand. In some examples of this disclosure, these problems are addressed by providing a simple, practical way in which a sportsperson can understand, apply and predict the effects of air density in his sport.

Accordingly, some examples introduce the use of a single variable, referred to herein as an "effective altitude", to specify an atmosphere's air density. To do this, a reference atmosphere is used whose air temperature and relative humidity values are fixed at preset values. As just one example, and without limiting example values, a preset air temperature may be 15 degrees Celsius (53 degrees Fahrenheit) and the preset relative humidity may be 50%. Using known relations between the atmospheric variables that determine air pressure, an effective altitude is calculated as the altitude in this reference atmosphere where the air density equals the air density of an atmosphere of interest. An atmosphere of interest can for example be the prevailing atmosphere in which the sportsperson is participating.

With knowledge of the effective altitude, and no more, a sportsperson can in some examples understand the effects of the atmosphere on his or her performance as a single variable. During a sports career he or she can reference his or her performance to effective altitude by practicing in different atmospheric conditions. Once a sportsperson understands how their performance varies with or is related to effective altitude, he can predict his performance in future or expected atmospheric conditions. He can also characterize the atmospheric conditions at a competitive event into a value of effective altitude allowing the sportsperson to understand what adjustments to make for the prevailing conditions.

In several aspects, the disclosed subject matter differs from what currently exists. For example, it is known that projectile flight may be affected by air density. Air density is in turn dependent on several factors including temperature, relative humidity, and air pressure. It is hard for a sportsperson to understand and apply multiple factors that may act together in determining air density affecting the flight of a projectile. Some present examples provide the sportsperson with a simpler, single variable description of atmospheric conditions presented in an intuitive way.

In some examples, the disclosed technology can be incorporated into a computerized training aid for sportspeople. Some examples include a computerized tactical aid that a sportsperson can use at a competitive event.

Thus, in one example embodiment, a method of tracking a moving sports object includes determining respective values for an air temperature, an air pressure, and a relative humidity of an environment of interest; based on the determined respective values of the air temperature, the air pressure, and the relative humidity, calculating an air density for the environment of interest to derive a first air density value for the environment of interest; determining an altitude value for a reference environment to derive a first altitude value; using the first altitude value to calculate a related air pressure value; using the calculated related air pressure value, and a preset temperature value and a preset relative humidity value for the reference environment, calculating an air density for the reference environment to derive a second air density value; comparing the first air density value and the second air density value to derive an absolute difference value; comparing the absolute difference value against a preset comparison value; and generating an output based on whether the absolute difference value is equal to or smaller than the preset comparison value, the output including an indicator of the effective altitude.

In one example embodiment, a system for tracking a moving sports object comprises processors and a memory storing instructions that, when executed by at least one processor among the processors, cause the system to perform operations comprising determining respective values for an air temperature, an air pressure, and a relative humidity of an environment of interest; based on the determined respective values of the air temperature, the air pressure, and the relative humidity, calculating an air density for the environment of interest to derive a first air density value for the environment of interest; determining an altitude value for a reference environment to derive a first altitude value; using the first altitude value to calculate a related air pressure value; using the calculated related air pressure value, and a preset temperature value and a preset relative humidity value for the reference environment, calculating an air density for the reference environment to derive a second air density value; comparing the first air density value and the second air density value to derive an absolute difference value; comparing the absolute difference value against a preset comparison value; and generating an output based on whether the absolute difference value is equal to or smaller than the preset comparison value, the output including an indicator of the effective altitude.

In another example embodiment, a computer-readable medium (CRM) comprises instructions that, when read by a computer, cause the computer to perform operations comprising, determining respective values for an air temperature, an air pressure, and a relative humidity of an environment of interest; based on the determined respective values of the air temperature, the air pressure, and the relative humidity, calculating an air density for the environment of interest to derive a first air density value for the environment of interest; determining an altitude value for a reference environment to derive a first altitude value; using the first altitude value to calculate a related air pressure value; using the calculated related air pressure value, and a preset temperature value and a preset relative humidity value for the reference environment, calculating an air density for the reference environment to derive a second air density value; comparing the first air density value and the second air density value to derive an absolute difference value; comparing the absolute difference value against a preset comparison value; and generating an output based on whether the absolute difference value is equal to or smaller than the preset comparison value, the output including an indicator of the effective altitude.

Further or other variations or orders of the method operations are possible. In some examples, the related air pressure value is based on:

Related air pressure=$A*\exp(-\text{Altitude}*B)$, where Air Pressure is in Pascal's and Altitude is in meters, and A and B are empirical constants.

In some examples, the operations further comprise iteratively adjusting the value of the first altitude value, and repeating the operations to derive the absolute difference value, until a matching condition is reached in which the absolute difference value is equal to or smaller than the preset comparison value.

In some examples, the operations further comprise assigning the value of the first altitude value to the effective altitude and generating the indicator of the effective altitude as the output.

In some examples, the operations further comprise calculating or generating a flightpath of the sports object based on the effective altitude.

In some examples, the operations further comprise including a value of a wind speed or direction into the calculation or generation of the flightpath.

In some examples, the operations further comprise including a value of a height difference between a release position and a landing position of the sports object into the calculation or generation of the flightpath.

DETAILED DESCRIPTION

Figure 1:
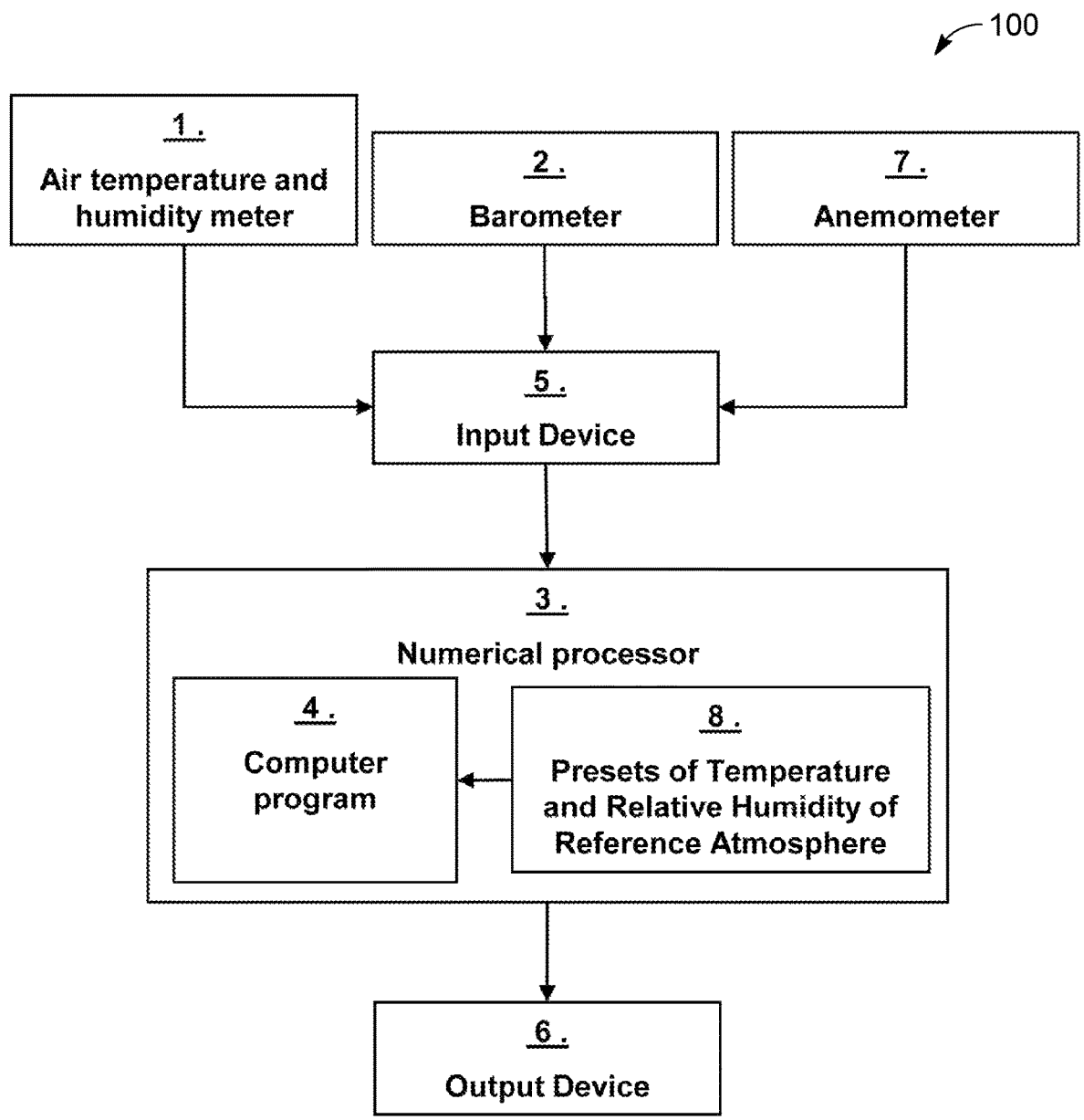
FIG. 1 is a schematic view of components of a system 100 for determining an effective altitude in relation to a moving object or projectile, or an environment in which the object or projectile moves, in accordance with example embodiments.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium"

should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2019-2020, EDH US LLC, All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

FIG. 1 is a schematic view of components of a system 100 for determining an effective altitude in relation to a moving object or projectile, or an environment in which the object or projectile moves, in accordance with example embodiments. Although examples of the present subject matter are discussed in relation to sports activities (sports objects and projectiles), it will be appreciated that other applications are possible where applicable.

An example system 100 includes environmental sensing and processing components. The environmental sensing and processing components may include components such as an air temperature and humidity meter 1, a barometer 2, a numerical processor 3, a computer program 4, an input device 5, an output device 6, an anemometer 7, and preset values (presets) of temperature and relative humidity of a reference atmosphere 8. Projectile tracking components for tracking a sports object may be associated with or exchange data with the system 100. Tracking components may include devices such as radar guns, doppler sensors, and boresight antennae.

In some examples, the air temperature and humidity meter 1 is used to measure the temperature and relative humidity of an atmosphere of interest. The barometer 2 is used to measure the air pressure of the atmosphere of interest at approximately the same time and place. The measurements are entered into the numerical processor 3 by means of the input device 5. The numerical processor 3 is programmed with a computer program 4 that performs calculations to determine an effective altitude for a reference atmosphere for the preset values of temperature and relative humidity 8. The resulting effective altitude is presented as an output on the output device 6.

In some examples, measurements of wind speed and direction from an anemometer 7 can be input to the numerical processor 4 through the input device 5. Wind speed and direction can be used by the computer program 5 to calculate the effect of wind on the flight of the object, in addition to the effect of only air density. Other system components to derive other variables or input values are possible. Measured or known temperature, pressure and humidity values of an atmosphere of interest can be used to calculate an effective altitude for a reference atmosphere.

Figure 2:
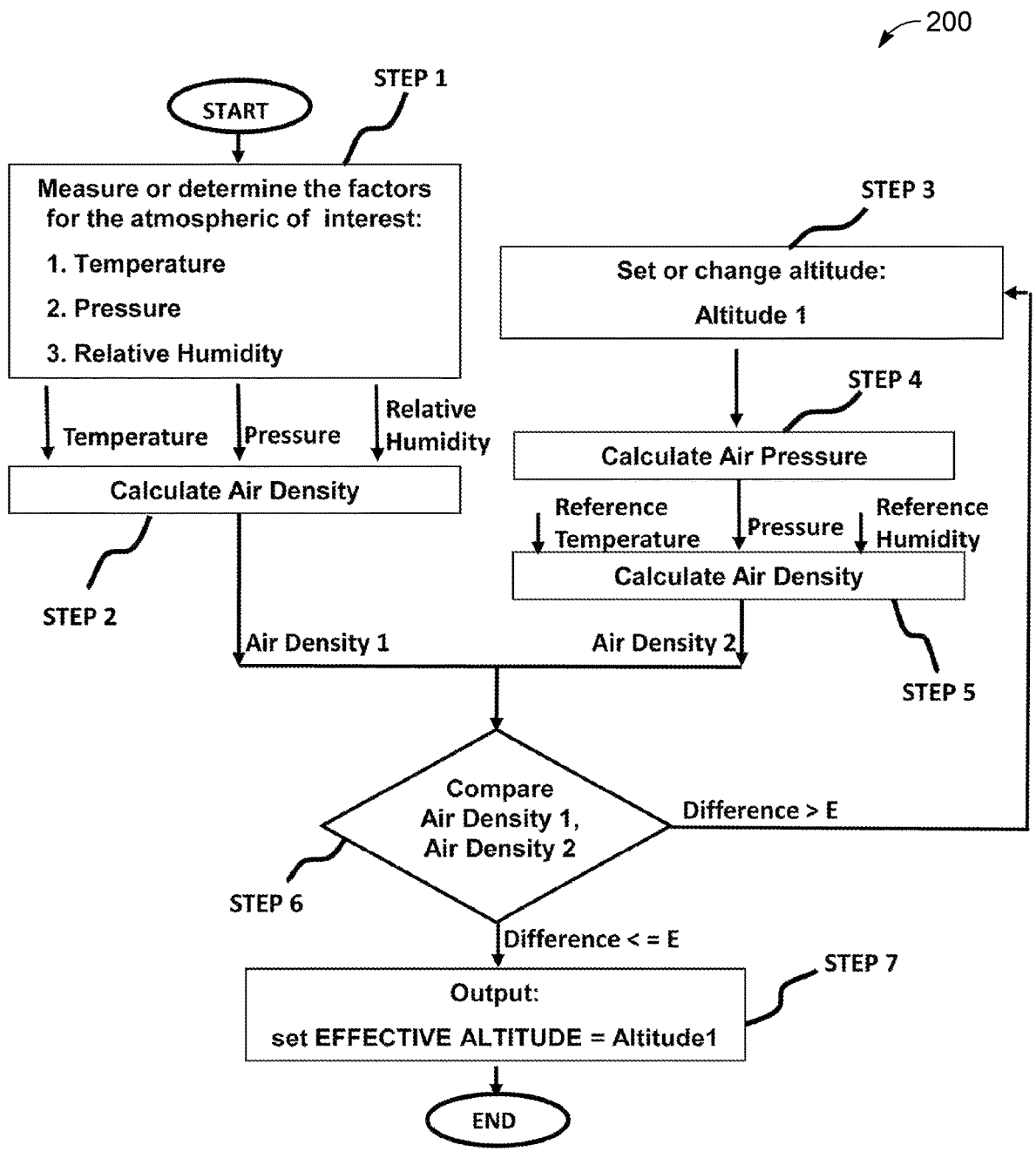
FIG. 2 is a flow chart depicting example operations in a method 200 of determining an effective altitude, in accordance with an example embodiment.

Embodiments of the present subject matter may include methods. With reference to FIG. 2, example operations (steps) in a method 200 for determining an effective altitude in relation to a moving object or projectile, or an environment (or atmosphere) in or through which the object or projectile moves, are shown. These operations may be performed iteratively, or in other order.

In Step 1 the air temperature, air pressure, and relative humidity of the environment of interest are determined. These values may be determined or derived by the environmental monitoring components of the tracking system 100 of FIG. 1. In other examples, the values may be derived from devices embedded in electronic devices such as smart phones or tablet computers. Other examples may include internet-based weather data sources that provide location specific atmospheric conditions.

Step 2 calculates the air density for the temperature, relative humidity, and air pressure of the environment of interest. This result of this calculation is "Air Density 1". The numerical relations between the variables may be determined, in some examples, in accordance with techniques described in the Manual of the ICAO standard atmosphere calculations by the NACA, document number NACA-TN-3182, first published on May 1, 1954. In this publication, the relations between the atmospheric variables, as applicable to the lower atmosphere (troposphere) can be found.

In Step 3 an altitude value for the reference atmosphere is chosen or set ("Altitude 1").

Step 4 uses the value of Altitude 1 to calculate a related Air Pressure. An example relation that can be used for this calculation is: Air Pressure=A*exp (−Altitude*B), where Air Pressure is in Pascal's and Altitude is in meters, and A and B are empirical constants. Values for A and B can be found for example in educational publications such as 1728 Software Systems. In some examples, a relation between Altitude and Air Pressure does not have to be precise as long as the chosen relation is used consistently.

Step 5 takes the calculated Air Pressure from Step 4 as well as a preset reference atmosphere temperature (for example be 15 degrees Celsius) and a preset relative humidity (for example 50%), and using the same relationships or calculator used in Step 1, to calculate the Air Density for this set of values. The result of this step is "Air Density 2".

Step 6 compares the values of Air Density 1 and Air Density 2. If the absolute value of the difference is larger than an arbitrary small amount (E), which can be a preset comparison value (or preset amount E), the process returns to Step 3. In Step 3 the value of Altitude 1 can be either increased or decreased by a finite amount, and Steps 4, 5, and 6 repeated. This process is repeated iteratively with the aim of finding a value for Altitude 1 where the absolute value of the difference between Air density 1 and Air Density 2 is equal to or smaller than the preset amount E. When this condition is reached, Step 7 is performed where the value of Altitude 1 is assigned to the effective altitude for the atmosphere of interest and is presented as the output.

Some example methods 200 include programming a numerical processor, equipped with suitable input and output devices, with a computer program that is designed to allow entry of measured or known atmospheric values of temperature, humidity and pressure. The computer program is in addition programmed with the relevant scientific relationships to convert atmospheric values to air pressure. In addition, the computer program configures the processor to calculate the air pressure related to a specific altitude, using a suitable scientific relationship. The computer program reads the preset stored values of the reference atmosphere and perform calculations in an iterative way to find the altitude for the reference atmosphere where the air temperature is near enough the same as the air pressure calculated for the atmosphere of interest, as specified by the input atmospheric values. This altitude (i.e. the effective altitude) is the desired result which can be output on the numerical processor's output device.

In some example systems 100, at least the following components are provided: a numerical processor (3), computer program (4), input device (5), output device (6), and stored preset reference atmosphere data (8). In some example systems 100, optional components may include a temperature and humidity meter (1), barometer (2), and anemometer (7). In some examples, temperature, humidity and air pressure data can be obtained from external systems including online weather data, so that measuring instruments are not essential. Wind speed and direction data, if desired, can also be obtained from external weather data sources. In some examples, the computer program can be adapted to include wind speed and direction, being movement of the air medium, in the calculation of an object's flight in addition to the effects of air density. While not related to atmospheric conditions, other information of potential significance to the sportsperson such as the height difference between the object's release position and the expected or desired landing position can also be input to and calculated by the computer program and provide a corresponding output.

Thus, in some examples, a system 100 operator (typically a sportsperson or coach engaging with the output device 6) can calculate or be shown an effective altitude for an atmosphere of interest. When practicing, the sportsperson can relate his or her performance to a single, simple variable. When practicing or competing in different atmospheric conditions, he or she can relate their performance to the prevailing atmosphere by determining the effective altitude of the prevailing conditions and using their skill and experience to apply this knowledge of the effective altitude to improve their performance. In some examples, the disclosed technology can be incorporated into a computerized training aid for sportspeople. Some examples include a computerized tactical aid that a sportsperson can use at a competitive event.

Figure 3:
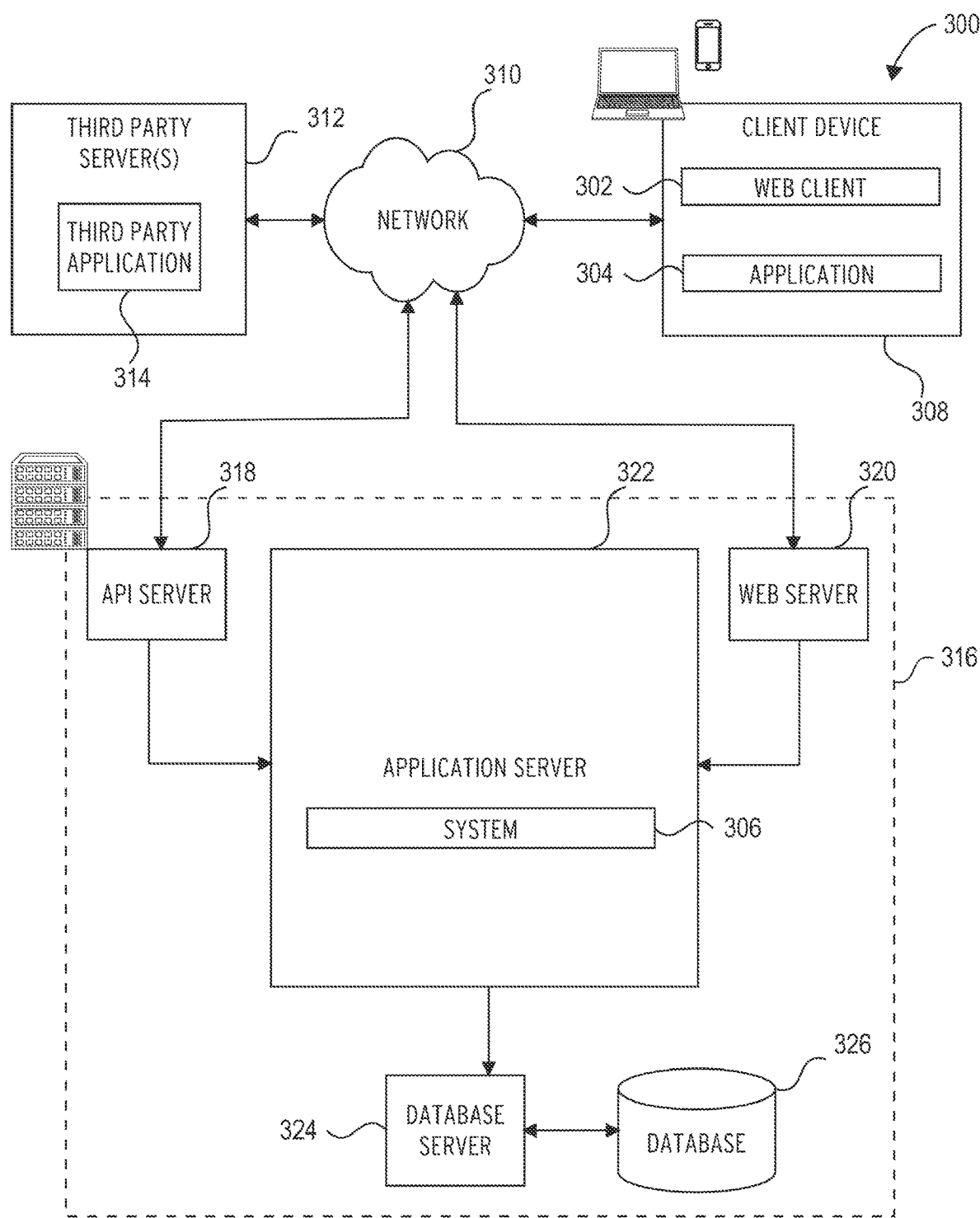
FIG. 3 is a block diagram illustrating a networked system, according to some example embodiments.

With reference to FIG. 3, an example embodiment of a high-level SaaS network architecture 300 is shown. A networked system 316 provides server-side functionality via a network 310 (e.g., the Internet or wide area network (WAN)) to a client device 308. A web client 302 and a programmatic client, in the example form of an application 304 are hosted and execute on the client device 308. The networked system 316 includes and application server 322, which in turn hosts a system 306 (for example the system 100 of FIG. 1) that provides a number of functions and services to the application 304 that accesses the networked system 316. The application 304 also provides a number of interfaces described herein, which present output of the tracking and analysis operations to a user of the client device 308. An interface for presenting such output may be included in the output device 6 of FIG. 1.

The client device 308 enables a user to access and interact with the networked system 316. For instance, the user provides input (e.g., touch screen input or alphanumeric input) to the client device 308, and the input is communicated to the networked system 316 via the network 310. In this instance, the networked system 316, in response to receiving the input from the user, communicates information back to the client device 308 via the network 310 to be presented to the user.

An Application Program Interface (API) server 318 and a web server 320 are coupled to, and provide programmatic and web interfaces respectively, to the application server 322. The application server 322 hosts a system 306, which includes components or applications. The application server 322 is, in turn, shown to be coupled to a database server 324 that facilitates access to information storage repositories (e.g., a database 326). In an example embodiment, the database 326 includes storage devices that store information accessed and generated by the system 306.

Additionally, a third-party application 314, executing on a third-party server 312, is shown as having programmatic access to the networked system 316 via the programmatic interface provided by the Application Program Interface (API) server 318. For example, the third-party application 314, using information retrieved from the networked system 316, may support one or more features or functions on a website hosted by the third-party.

Turning now specifically to the applications hosted by the client device 308, the web client 302 may access the various systems (e.g., system 306) via the web interface supported by the web server 320. Similarly, the application 304 (e.g., an "app") accesses the various services and functions provided by the system 306 via the programmatic interface provided by the Application Program Interface (API) server 318. The application 304 may, for example, an "app" executing on a client device 308, such as an iOS or Android OS application to enable user to access and input data on the networked system 316 in an off-line manner, and to perform batch-mode communications between the programmatic client application 304 and the networked system 316.

Further, while the SaaS network architecture 300 shown in FIG. 3 employs a client-server architecture, the present inventive subject matter is of course not limited to such an architecture, and could equally well find application in a distributed, or peer-to-peer, architecture system, for example. The system 306 could also be implemented as a standalone software program, which do not necessarily have networking capabilities.

Figure 4:
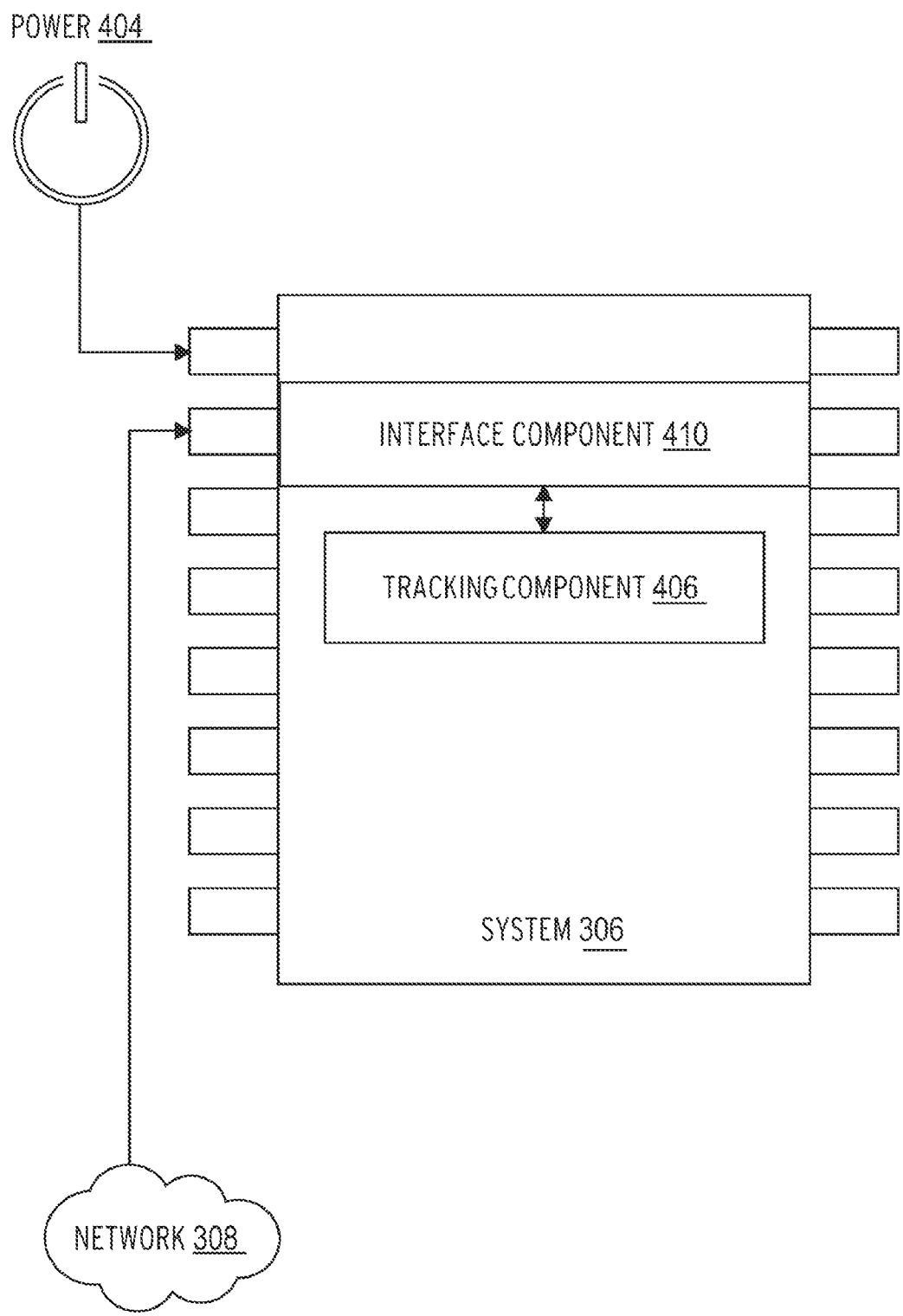
FIG. 4 is a block diagram showing some details of a system for determining an effective altitude, according to some example embodiments.

FIG. 4 is a block diagram showing for the architectural details of a system 306, according to some example embodiments. Specifically, the system 306 is shown to include an interface component 410 by which the system 306 communicates (e.g., over the network 408) with other systems within the SaaS network architecture 300. The interface component 410 is collectively coupled to a Tracking component 406 that operates to perform one or more operations of the methods described herein.

Figure 5:
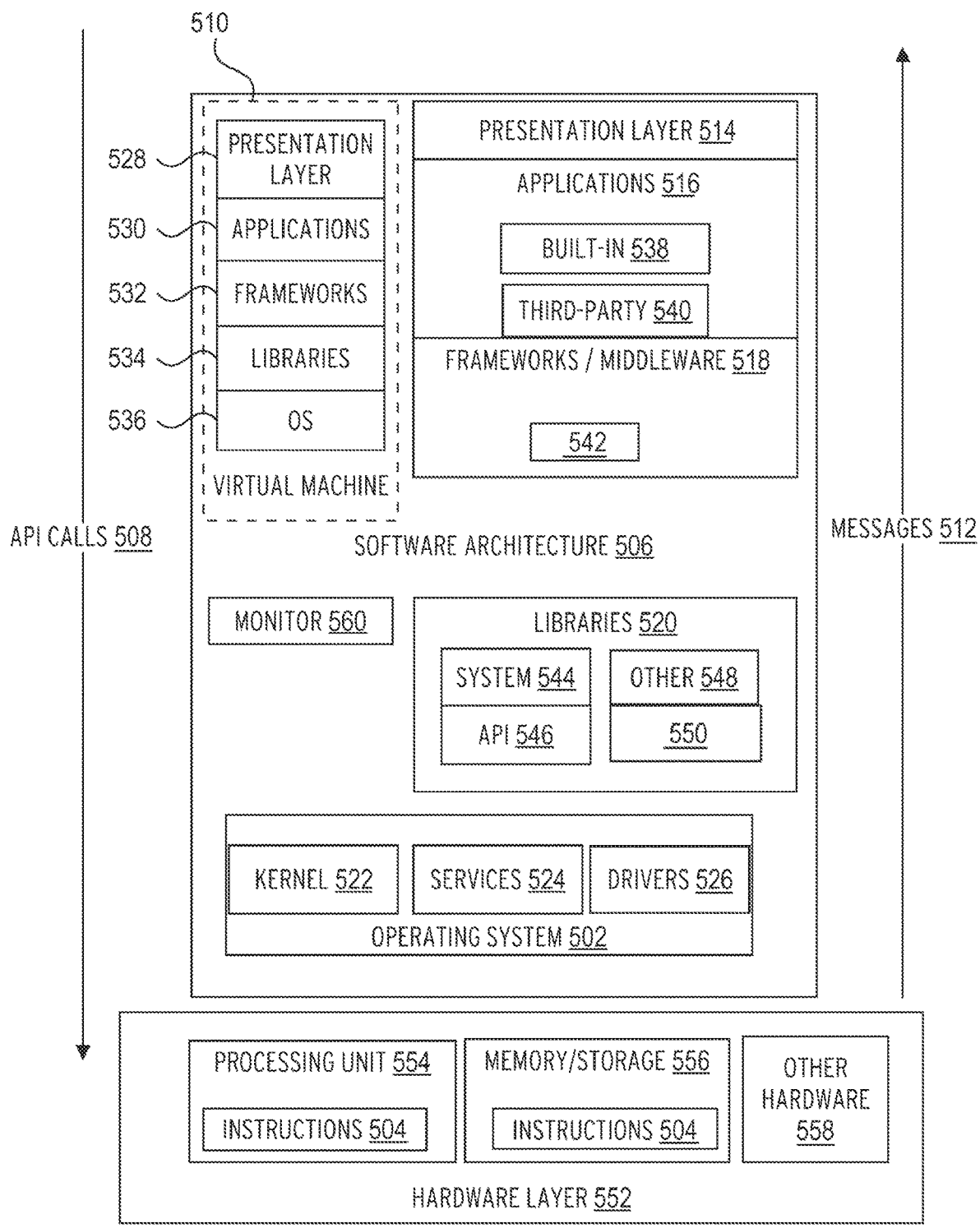
FIG. 5 is a block diagram illustrating representative software architecture, which may be used in conjunction with various hardware architectures herein described.

FIG. 5 is a block diagram illustrating an example software architecture 506, which may be used in conjunction with various hardware architectures herein described. FIG. 5 is a non-limiting example of a software architecture and it will be appreciated that many other architectures may be implemented to facilitate the functionality described herein. The software architecture 506 may execute on hardware such as machine 1200 of FIG. 12 that includes, among other things, processors 1204, memory 1214, and I/O components 1218. A representative hardware layer 552 is illustrated and can represent, for example, the machine 1200 of FIG. 12. The representative hardware layer 552 includes a processing unit 554 having associated executable instructions 504. Executable instructions 504 represent the executable instructions of the software architecture 506, including implementation of the methods, components and so forth described herein. The hardware layer 552 also includes memory and/or storage modules memory/storage 556, which also have executable instructions 504. The hardware layer 552 may also comprise other hardware 558.

In the example architecture of FIG. 5, the software architecture 506 may be conceptualized as a stack of layers where each layer provides particular functionality. For example, the software architecture 506 may include layers such as an operating system 502, libraries 520, applications 516 and a presentation layer 514. Operationally, the applications 516 and/or other components within the layers may invoke application programming interface (API) API calls 508 through the software stack and receive a response as in response to the API calls 508. The layers illustrated are representative in nature and not all software architectures have all layers. For example, some mobile or special purpose operating systems may not provide a frameworks/middleware 518, while others may provide such a layer. Other software architectures may include additional or different layers.

The operating system 502 may manage hardware resources and provide common services. The operating system 502 may include, for example, a kernel 522, services 524 and drivers 526. The kernel 522 may act as an abstraction layer between the hardware and the other software layers. For example, the kernel 522 may be responsible for memory management, processor management (e.g., scheduling), component management, networking, security settings, and so on. The services 524 may provide other common services for the other software layers. The drivers 526 are responsible for controlling or interfacing with the underlying hardware. For instance, the drivers 526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 520 provide a common infrastructure that is used by the applications 516 and/or other components and/or layers. The libraries 520 provide functionality that allows other software components to perform tasks in an easier fashion than to interface directly with the underlying operating system 502 functionality (e.g., kernel 522, services 524 and/or drivers 526). The libraries 520 may include system libraries 544 (e.g., C standard library, and OpenCV libraries) that may provide functions such as memory allocation functions, string manipulation functions, mathematical functions, and the like. In addition, the libraries 520 may include API libraries 546 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 520 may also include a wide variety of other libraries 548 to provide many other APIs to the applications 516 and other software components/modules.

The frameworks frameworks/middleware 518 (also sometimes referred to as middleware) provide a higher-level common infrastructure that may be used by the applications 516 and/or other software components/modules. For example, the frameworks/middleware 518 may provide various graphic user interface (GUI) functions, high-level resource management, high-level location services, and so forth. The frameworks/middleware 518 may provide a broad spectrum of other APIs that may be utilized by the applications 516 and/or other software components/modules, some of which may be specific to a particular operating system or platform.

The applications 516 include built-in applications 538 and/or third-party applications 540. Examples of representative built-in applications 538 may include, but are not limited to, a contacts application, a browser application, a book reader application, a location application, a media application, a messaging application, and/or a game application. Third-party applications 540 may include any an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 540 may invoke the API calls 508 provided by the mobile operating system (such as operating system 502) to facilitate functionality described herein.

The applications 516 may use built in operating system functions (e.g., kernel 522, services 524 and/or drivers 526), libraries 520, and frameworks/middleware 518 to create user interfaces to interact with users of the system. Alternatively, or additionally, in some systems interactions with a user may occur through a presentation layer, such as presentation layer 514. In these systems, the application/component "logic" can be separated from the aspects of the application/component that interact with a user.

Some software architectures use virtual machines. In the example of FIG. 5, this is illustrated by a virtual machine 510. The virtual machine 510 creates a software environment where applications/components can execute as if they were executing on a hardware machine (such as the machine 600 of FIG. 6, for example). The virtual machine 510 is hosted by a host operating system (operating system (OS) 536 in FIG. 5) and typically, although not always, has a virtual machine monitor 560, which manages the operation of the virtual machine as well as the interface with the host operating system (i.e., operating system 502). A software architecture executes within the virtual machine 510 such as an operating system operating system (OS) 536, libraries 534, frameworks 532, applications 530 and/or presentation layer 528. These layers of software architecture executing within the virtual machine 510 can be the same as corresponding layers previously described or may be different.

Figure 6:
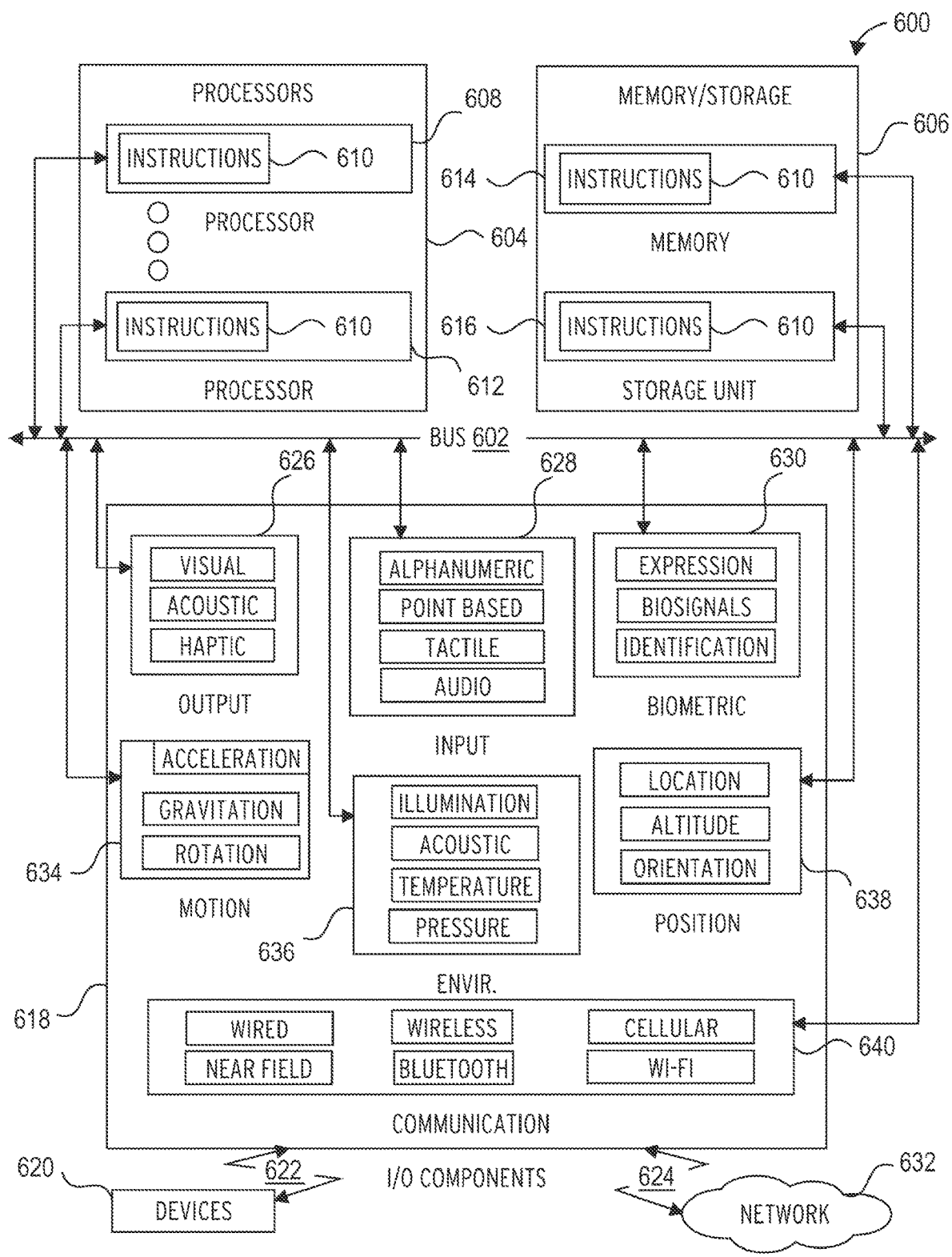
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 610 (e.g., software, a program, an application, an applet, an app, or other executable code) for causing the machine 600 to perform any one or more of the methodologies discussed herein may be executed. As such, the instructions may be used to implement modules or components described herein. The instructions transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 610, sequentially or otherwise, that specify actions to be taken by machine 600. Further, while only a single machine 600 is illustrated, the term "machine" shall also be taken to include a collection of machines that individually or jointly execute the instructions 610 to perform any one or more of the methodologies discussed herein.

The machine 600 may include processors 604, memory memory/storage 606, and I/O components 618, which may be configured to communicate with each other such as via a bus 602. The memory/storage 606 may include a memory 614, such as a main memory, or other memory storage, and a storage unit 616, both accessible to the processors 604 such as via the bus 602. The storage unit 616 and memory 614 store the instructions 610 embodying any one or more of the methodologies or functions described herein. The instructions 610 may also reside, completely or partially, within the memory 614, within the storage unit 616, within at least one of the processors 604 (e.g., within the processor's cache memory), or any suitable combination thereof, during execution thereof by the machine 600. Accordingly, the memory 614, the storage unit 616, and the memory of processors 604 are examples of machine-readable media.

The I/O components 618 may include a wide variety of components to receive input, provide output, produce output, transmit information, exchange information, capture measurements, and so on. The specific I/O components 618 that are included in a particular machine will depend on the type of machine. For example, portable machines such as mobile phones will likely include a touch input device or other such input mechanisms, while a headless server machine will likely not include such a touch input device. It will be appreciated that the I/O components 618 may include many other components that are not shown in FIG. 6. The I/O components 618 are grouped according to functionality merely for simplifying the following discussion and the grouping is in no way limiting. In various example embodiments, the I/O components 618 may include output components 626 and input components 628. The output components 626 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 628 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 618 may include biometric components 630, motion components 634, environmental environment components 636, or position components 638 among a wide array of other components. For example, the biometric components 630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 634 may include acceleration sensor components (e.g., accelerometer), gravitation sensor components, rotation sensor components (e.g., gyroscope), and so forth. The environment components 636 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 638 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 618 may include communication components 640 operable to couple the machine 600 to a network 632 or devices 620 via coupling 622 and coupling 624 respectively. For example, the communication components 640 may include a network interface component or other suitable device to interface with the network 632. In further examples, communication components 640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 620 may be another machine or any of a wide variety of peripheral devices (e.g., a peripheral device coupled via a Universal Serial Bus (USB)).

Moreover, the communication components 640 may detect identifiers or include components operable to detect identifiers. For example, the communication components processors communication components 640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 640, such as, location via Internet Protocol (IP) geo-location, location via Wi-Fi® signal triangulation, location via detecting a NFC beacon signal that may indicate a particular location, and so forth.

The computer-based data processing systems and methods described above are for purposes of example only and may be implemented in any type of computer system or programming or processing environment, or in a computer program, alone or in conjunction with hardware. The present inventive subject matter may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the present subject matter is not limited to any specific computer language, program, or computer. It is further contemplated that the present subject matter may be run on a stand-alone computer system or may be run from a server computer system that can be accessed by a plurality of client computer systems interconnected over an intranet network, or that is accessible to clients over the Internet. In addition, many embodiments of the present subject matter have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present subject matter. It should be understood, of course, that the foregoing relates to exemplary embodiments of the invention and that modifications may be made without departing from the scope of the invention as set forth in the claims further below.

Although the subject matter has been described with reference to specific example embodiments, it will be evident that various modifications and changes may be made to these embodiments without departing from the broader scope of the disclosed subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for determining an effective altitude in relation to a moving sports object, the method comprising operations including:
   obtaining, with a processor, respective values for an air temperature, an air pressure, and a relative humidity of an environment of interest;
   based on the obtained respective values of the air temperature, the air pressure, and the relative humidity, calculating, with the processor, an air density for the environment of interest to derive a first air density value for the environment of interest;
   determining, with the processor, an altitude value for a reference environment to derive a first altitude value;
   using the first altitude value to calculate, with the processor, a related air pressure value;
   using the calculated related air pressure value, and a preset temperature value and a preset relative humidity value for the reference environment, calculating, with the processor, an air density for the reference environment to derive a second air density value;
   comparing, with the processor, the first air density value and the second air density value to derive an absolute difference value;
   comparing, with the processor, the absolute difference value against a preset comparison value;
   generating and displaying an output, on a display, the output including an indicator of the effective altitude based on the comparison of the absolute difference value against the preset comparison value; and
   calculating and displaying on the display a flightpath of the sports object based on the effective altitude.

2. The method of claim 1, further comprising iteratively adjusting the value of the first altitude value, and repeating the operations to derive the absolute difference value, until a matching condition is reached in which the absolute difference value is equal to or smaller than the preset comparison value.

3. The method of claim 1, further comprising assigning the value of the first altitude value to the effective altitude and generating the indicator of the effective altitude as the output.

4. The method of claim 1, further comprising displaying on the display a value of a wind speed or direction into the calculation or generation of the flightpath.

5. The method of claim 1, further comprising displaying on the display a value of a height difference between a release position and a landing position of the sports object into the calculation or generation of the flightpath.

6. The method of claim 1, wherein the obtaining includes obtaining the respective values via the Internet from weather data sources.

7. The method of claim 1, wherein the obtaining includes electronically obtaining the respective values from an air temperature and humidity meter, barometer and anemometer embedded in an electronic device.

8. A system for determining an effective altitude in relation to a moving sports object, the system including:
   a display;
   processors; and
   a memory storing instructions that, when executed by at least one processor among the processors, cause the system to perform operations comprising:
   obtaining respective values for an air temperature, an air pressure, and a relative humidity of an environment of interest;
   based on the obtained respective values of the air temperature, the air pressure, and the relative humidity, calculating an air density for the environment of interest to derive a first air density value for the environment of interest;
   determining an altitude value for a reference environment to derive a first altitude value;
   using the first altitude value to calculate a related air pressure value;
   using the calculated related air pressure value, and a preset temperature value and a preset relative humidity value for the reference environment, calculating an air density for the reference environment to derive a second air density value;
   comparing the first air density value and the second air density value to derive an absolute difference value;
   comparing the absolute difference value against a preset comparison value;
   generating and displaying an output, on a display, the output including an indicator of the effective altitude based on the comparison of the absolute difference value against the preset comparison value; and
   calculating and displaying on the display a flightpath of the sports object based on the effective altitude.

9. The system of claim 8, wherein the operations further comprise iteratively adjusting the value of the first altitude value, and repeating the operations to derive the absolute difference value, until a matching condition is reached in which the absolute difference value is equal to or smaller than the preset comparison value.

10. The system of claim 8, wherein the operations further comprise assigning the value of the first altitude value to the effective altitude and generating the indicator of the effective altitude as the output.

11. The system of claim 8, wherein the operations further comprise displaying on the display a value of a wind speed or direction into the calculation or generation of the flightpath.

12. The system of claim 8, wherein the operations further comprise displaying on the display a value of a height difference between a release position and a landing position of the sports object into the calculation or generation of the flightpath.

13. A machine-readable medium comprising instructions that, when read by a machine, cause the machine to perform operations in a method determining an effective altitude, the operations comprising, at least:
   obtaining respective values for an air temperature, an air pressure, and a relative humidity of an environment of interest;
   based on the obtained respective values of the air temperature, the air pressure, and the relative humidity, calculating an air density for the environment of interest to derive a first air density value for the environment of interest;
   determining an altitude value for a reference environment to derive a first altitude value;
   using the first altitude value to calculate a related air pressure value;
   using the calculated related air pressure value, and a preset temperature value and a preset relative humidity value for the reference environment, calculating an air density for the reference environment to derive a second air density value;
   comparing the first air density value and the second air density value to derive an absolute difference value;
   comparing the absolute difference value against a preset comparison value;
   generating and displaying an output, on a display, the output including an indicator of the effective altitude based on the comparison of the absolute difference value against the preset comparison value; and
   calculating and displaying on the display a flightpath of a sports object based on the effective altitude.

14. The medium of claim 13, wherein the operations further comprise iteratively adjusting the value of the first altitude value, and repeating the operations to derive the absolute difference value, until a matching condition is reached in which the absolute difference value is equal to or smaller than the preset comparison value.

15. The medium of claim 13, wherein the operations further comprise assigning the value of the first altitude value to the effective altitude and generating the indicator of the effective altitude as the output.

16. The medium of claim 13, wherein the operations further comprise displaying on the display a value of a wind speed or direction into the calculation or generation of the flightpath.

17. The medium of claim 13, wherein the operations further comprise displaying on the display a value of a height difference between a release position and a landing position of the sports object into the calculation or generation of the flightpath.

* * * * *

UNITED STATES PATENT AND TRADEMARK OFFICE
CERTIFICATE OF CORRECTION

PATENT NO. : 11,867,530 B2
APPLICATION NO. : 18/147354
DATED : January 9, 2024
INVENTOR(S) : Henri Johnson It is certified that error appears in the above-identified patent and that said Letters Patent is hereby corrected as shown below:

In the Specification

In Column 8, Line 20, delete "4" and insert --3-- therefor

In Column 8, Line 21, delete "5" and insert --4-- therefor

In Column 11, Line 5, delete "408)" and insert --308)-- therefor

In Column 11, Line 17, delete "1200" and insert --600-- therefor

In Column 11, Line 17, delete "FIG. 12" and insert --FIG. 6-- therefor

In Column 11, Line 18, delete "1204," and insert --604,-- therefor

In Column 11, Line 18, delete "1214," and insert --614,-- therefor

In Column 11, Line 18, delete "1218." and insert --618.-- therefor

In Column 11, Line 20, delete "1200" and insert --600-- therefor

In Column 11, Line 20, delete "FIG. 12." and insert --FIG. 6.-- therefor

Signed and Sealed this
Nineteenth Day of March, 2024

Katherine Kelly Vidal
*Director of the United States Patent and Trademark Office*